US012613705B2

(12) United States Patent
Huang

(10) Patent No.: US 12,613,705 B2
(45) Date of Patent: Apr. 28, 2026

(54) MULTI-PROCESSOR DEVICE, DATA PROCESSING SYSTEM AND PERIPHERAL CONTROLLER SHARING METHOD

(71) Applicant: NUVOTON TECHNOLOGY CORPORATION, Hsinchu City (TW)

(72) Inventor: Yung-Chang Huang, Zhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 115 days.

(21) Appl. No.: 18/494,044

(22) Filed: Oct. 25, 2023

(65) Prior Publication Data

US 2024/0211267 A1 Jun. 27, 2024

(30) Foreign Application Priority Data

Dec. 21, 2022 (TW) ................................. 111149267

(51) Int. Cl.
*G06F 9/38* (2018.01)
*G06F 9/54* (2006.01)
*G06F 15/173* (2006.01)

(52) U.S. Cl.
CPC ............ *G06F 9/3877* (2013.01); *G06F 9/544* (2013.01)

(58) Field of Classification Search
CPC ... G06F 9/3877; G06F 9/544; G06F 15/17312
See application file for complete search history.

(56) References Cited

U.S. PATENT DOCUMENTS

| | | | | |
|---|---|---|---|---|
| 6,260,098 | B1* | 7/2001 | Ku | G06F 13/405 |
| | | | | 710/36 |
| 10,707,875 | B1* | 7/2020 | Orthner | H03K 19/17744 |
| 2005/0102437 | A1* | 5/2005 | Pettey | G06F 13/4022 |
| | | | | 710/1 |
| 2006/0067349 | A1* | 3/2006 | Ronciak | H04L 47/50 |
| | | | | 370/412 |
| 2010/0191911 | A1 | 7/2010 | Heddes et al. | |
| 2012/0290763 | A1* | 11/2012 | Li | G06F 9/52 |
| | | | | 710/308 |
| 2018/0026916 | A1* | 1/2018 | Banerjee | H04L 47/30 |
| | | | | 370/412 |

FOREIGN PATENT DOCUMENTS

| | | | |
|---|---|---|---|
| EP | 3789884 | A1 | 3/2021 |
| TW | 201519080 | A | 5/2015 |
| TW | 201633161 | A | 9/2016 |
| TW | 201719446 | A | 6/2017 |

* cited by examiner

*Primary Examiner* — Shawn Doman
(74) *Attorney, Agent, or Firm* — MUNCY, GEISSLER, OLDS & LOWE, P.C.

(57) ABSTRACT

A multi-processor device comprises more than two processors. The multi-processor device can make the two processors running different operating systems (for example, Linux, real-time operating system (RT OS) or non-operating system (non-OS)) share one peripheral controller by allocating transmit descriptions, receive descriptions, transmit buffers corresponding to the transmit descriptions and receive buffers corresponding to the receive descriptions of the two processors in a shared memory. The peripheral device can process the data associated with the two processors. In one embodiment, the peripheral controller can be an Ethernet controller, and the peripheral device is an Ethernet network card.

8 Claims, 7 Drawing Sheets

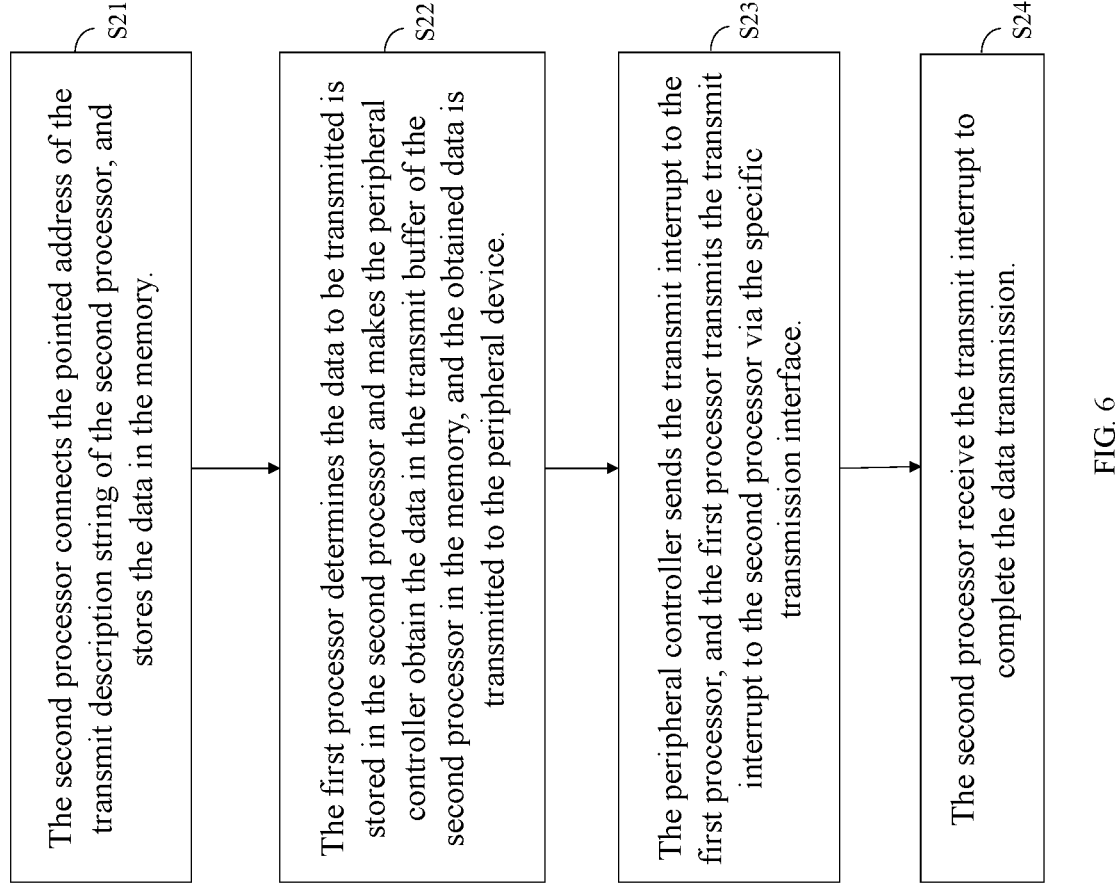

The second processor connects the pointed address of the transmit description string of the second processor, and stores the data in the memory.
S21

The first processor determines the data to be transmitted is stored in the second processor and makes the peripheral controller obtain the data in the transmit buffer of the second processor in the memory, and the obtained data is transmitted to the peripheral device.
S22

The peripheral controller sends the transmit interrupt to the first processor, and the first processor transmits the transmit interrupt to the second processor via the specific transmission interface.
S23

The second processor receive the transmit interrupt to complete the data transmission.
S24

FIG. 6

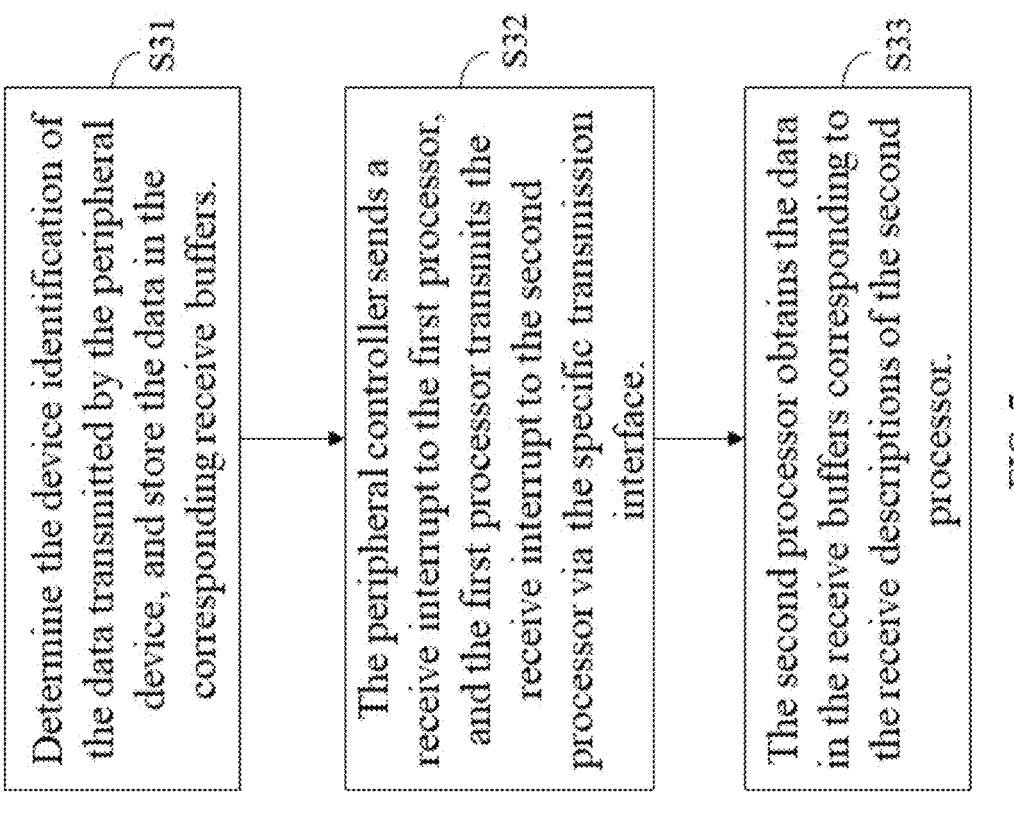

Determine the device identification of the data transmitted by the peripheral device, and store the data in the corresponding receive buffers. —S31

The peripheral controller sends a receive interrupt to the first processor, and the first processor transmits the receive interrupt to the second processor via the specific transmission interface. —S32

The second processor obtains the data in the receive buffers corresponding to the receive descriptions of the second processor. —S33

FIG. 7

MULTI-PROCESSOR DEVICE, DATA PROCESSING SYSTEM AND PERIPHERAL CONTROLLER SHARING METHOD

CROSS-REFERENCE TO RELATED APPLICATION

This application claims the priority from the TW Patent Application No. 111149267, filed on Dec. 21, 2022, and all contents of such TW Patent Application are comprised in the present disclosure.

BACKGROUND

1. Field of the Invention

The present disclosure relates to a multi-processor device, in particular to, a multi-processor device, a data processing system and a peripheral controller sharing method can make several processors share a peripheral device for transmitting and processing data.

2. Description of the Related Art

In the related art, system on chip (SOC) has been able to integrate several processors in one chip so that a multi-processor device is achieved. Generally speaking, the multi-processor device comprises a first processor as a primary processor, and a second processor as a secondary processor. For example, the first processor may be a relatively high-performance Cortxe-A35 dual-core central processing unit, and the second processor may be a relatively general Cortex-M4 central processing unit. The first processor and the second processor may operate independently of each other and operate in different operating system. Additionally, a small amount, for example, 16 bytes and low-speed transmission can be performed between the first processor and the second processor via a specific transmission interface commonly known as a wormhole. The first processor and the second processor share the same memory, such as a shared dynamic random access memory or a synchronous dynamic random access memory. That is, both of the first processor and the second processor can directly access the memory.

There is a peripheral controller inside the SOC. The peripheral controller may be connected with a Serial Peripheral Interface (SPI), an Inter-Integrated Circuit (I²C), an Integrated Interchip Sound (I²S), a Universal Asynchronous Receiver/Transmitter (UART), a Universal Serial Bus (USB) or a Gigabit Ethernet Media Access Control interface (GMAC) to communicate with external peripheral devices. There is also a System Security Peripheral Configuration Controller (SSPCC) inside the SOC to allocate the peripheral controller to the first processor or the second processor. In the related art, a peripheral controller can only be allocated to the first processor or the second processor at one time. That is, the first processor and the second processor cannot use the peripheral controller to control the same peripheral device at the same time.

In addition, the operation of the peripheral controller is not only the reading and writing of a register, but also involves the operation state of the device, the control of the peripheral device and the processing of the protocol and interrupt for transmitting data. Therefore, it is difficult for the first processor and the second processor running in different operating systems to simultaneously control the same peripheral device. For example, if the Ethernet controller of a GMAC, which is one kind of the peripheral controllers, is allocated to the Cortxe-A35 dual-core CPU, the Cortex-M4 CPU cannot use the same network port.

Please refer to FIG. 1, FIG. 1 is a schematic block diagram of a multi-processor device of a related art. The multi-processor device 1 may be a SOC. The multi-processor device 1 comprises the first processor 11, the second processor 12, the system security peripheral configuration controller 13, the Ethernet controller 14 and the memory 15. In some situations, the memory 15 may not be a component of the multi-processor device 1, but an external memory. When the Ethernet controller 14 is allocated to the first processor 111 via the system security peripheral configuration controller 13, the first processor 11 configures a plurality of transmit descriptions TXD1~TXDn, that is, usually 4 bytes and a plurality of corresponding transmit buffers TXB1~TXBn in the memory 15 via a software driver. Also, the first processor 11 configures a plurality of receive descriptions RXD1~RXDn, that is, usually 4 bytes and a plurality of corresponding receive buffer RXB1~RXBn in the memory 15 via the software driver. The transmit descriptions TXD1~TXDn form a transmit description string, and the receive descriptions RXD1~RXDn form a receive description string. The capacities of the transmit buffers TXB1~TXBn and the receive buffers RXB1~RXBn are the maximum capacity of one packet.

The Ethernet controller 14 comprises the register to indicate the transmit description string and the receive description string of the register. The Ethernet controller 14 comprises a direct memory access device for accessing the transmit description string, the receive description string, the transmit buffers TXB1~TXBn and the receive buffers RXB1~RXBn. Each of the transmit descriptions TXD1~TXDn and the receive descriptions RXD1~RXDn has an owner bit. The owner bit is used to identify the accessible state of the transmit descriptions TXD1~TXDn and the receive descriptions RXD1~RXDn for hardware or software. Generally, the software may only identify the transmit descriptions TXD1~TXDn and the receive descriptions RXD1~RXDn to achieve the transmission and reception of the packet.

In FIG. 1, the first processor 11 and the second processor 12 cannot simultaneously use the Ethernet controller 14 to control the Ethernet network card to transmit and receive the packet. Therefore, it is necessary to provide a solution for the first processor 11 and the second processor 12 to share the Ethernet controller 14 to control the Ethernet network card, and to transmit and receive the packet from the first processor 11 and the second processor 12.

SUMMARY

It can be understood from the abovementioned descriptions that the technical problem to be solve in the present disclosure is how to allow two processors to share the same peripheral controller on different operating systems, for example, Linux, RT OS and non-OS, so that the peripheral device can process the data associated with the two processors.

In order to solve the above conventional problems, an embodiment of the present disclosure provides a multi-processor device. The multi-processor device comprises a first processor, a second processor, a system peripheral configuration controller and a peripheral controller. The first processor is electrically connected a memory. The second processor is electrically connected to the first processor and the memory. Also, the second processor communicates with the first processor via a specific transmission interface. The system peripheral configuration controller is electrically connected to the first processor, the second processor and the peripheral controller. The system peripheral configuration controller is used to allocate the peripheral controller to the first processor or the second processor. The peripheral controller is electrically connected to the memory. The memory is allocated to a transmit description of the first processor and a transmit buffer corresponding to the transmit description of the first processor, and a transmit description of the second processor and a transmit buffer corresponding to transmit description of the second processor. When the peripheral controller is allocated to the first processor and the second processor will transmit the data to a peripheral device which is electrically connected to the peripheral controller, the second processor stores the data in the transmit buffer corresponding to the transmit description of the second processor, and the first processor controls the peripheral controller so that the peripheral device obtains the data in the transmit buffer corresponding to the transmit description of the second processor.

In order to solve the above conventional problems, an embodiment of the present disclosure provides a multi-processor device. The multi-processor device comprises a first processor, a second processor, a system peripheral configuration controller and a peripheral controller. The first processor is electrically connected to a memory. The second processor is electrically connected to the first processor and the memory. The second processor communicates with the first processor via a specific transmission interface. The system peripheral configuration controller is electrically connected to the first processor, the second processor and the peripheral controller. The system peripheral configuration controller is used to allocate the peripheral controller to the first processor or the second processor. The peripheral controller is electrically connected to the memory. The memory is allocated to a receive description of the first processor and a receive buffer corresponding to the receive description of the first processor, and a receive description of the second processor and a receive buffer corresponding to the receive description of the second processor. When the peripheral controller is allocated to the first processor and the peripheral controller receives the data transmitted via a peripheral device which is electrically connected to the peripheral controller, the peripheral controller stores the data in the receive buffer corresponding to the receive description of the first processor and/or in the receive buffer corresponding to the receive description of the second processor based on a device identification corresponding to the data. The first processor is used to receive the data in the receive buffer corresponding to the receive description of the first processor. The second processor is used to receive the data in the receive buffer corresponding to the receive description of the second processor.

In order to solve the above conventional problems, an embodiment of the present disclosure provides a data processing system. The data processing system comprises the abovementioned multi-processor device and the peripheral device.

In order to solve the above conventional problems, an embodiment of the present disclosure provides a peripheral controller sharing method. The method is implemented by the multi-processor device, and comprises the following steps. The first processor of the multi-processor device is used to initialize the peripheral controller of the multi-processor device to allocate a device identification of the first processor and a device identification of the second processor of the multi-processor device. The second processor queries the first processor for the device identification allocated to the second processor via the specific transmission interface after the first processor initializes of the peripheral controller completely. Then, the second processor is used to inform the first processor of addresses of the transmit description and the receive description of the second processor which the memory is allocated to via the specific transmission interface.

Based on the above, the multi-processor device, the data processing system and the peripheral controller sharing method provided by the present disclosure can allow the several processors in the multi-processor device to share the same peripheral device for transmitting and processing data.

BRIEF DESCRIPTION OF THE DRAWINGS

In order to allow the abovementioned and other purposes, features, advantages and embodiments of the present disclosure to be more clearly understood, the accompanying drawings are described as following:

FIG. 6 is a schematic flowchart of transmitting data via a peripheral controller sharing method according to an embodiment of the present disclosure; and FIG. 7 is a schematic flowchart of receiving data via a peripheral controller sharing method according to an embodiment of the present disclosure.

DESCRIPTION OF THE PREFERRED EMBODIMENTS

An aspect of the present disclosure is to make the several processors in a multi-processor device share a peripheral controller on different operating systems. The processors share peripheral devices via sharing the peripheral controller. In one of embodiments, the peripheral controller is, for example, an Ethernet controller, and the peripheral device is, for example, an Ethernet network card, so that the processors can share the same local area network, but the present disclosure is not limited thereto. In other embodiments, the peripheral controller is an I$^2$S interface controller, and the peripheral device is a sound card. In other embodiments, the peripheral controller is a USB interface controller, and the peripheral device is a solid state disk.

Further, the solution proposed by the present disclosure is: when the master control of the peripheral controller is allocated to a processor, the other processor informs the processor with the master control without interrupting the operation control of the peripheral controller and the peripheral controller transmits data. Thus, the purpose of sharing the peripheral controller and the peripheral device is achieved. In order to achieve the solution above, each of the processors allocates the sharing memory to transmit descriptions, receive descriptions, transmit buffers corresponding to the transmit description and receive buffers corresponding to the receive description. In this way, although the peripheral controller is allocated to only one of the processors, each of the processors can utilize its own transmit descriptions, receive descriptions, the transmit buffer corresponding to the transmit descriptions and the receive buffer corresponding to the receive descriptions to transmit data. From the perspective of explicit behavior, when other processors which the peripheral controller is not allocated to actually perform transmitting data in the background, the processor which the peripheral controller is allocated to operates in the original mode. However, an interrupt is transmitted to other processors via the specific transmission interface therebetween to notify that the data transmission and reception are completed when the corresponding transmit buffer or the corresponding receive buffer of other processors receive the data. The implementation details of the above concept are described below with accompanying drawings, but the contents of the following embodiments are only for example, which is not intended to limit the present disclosure.

Figure 1:
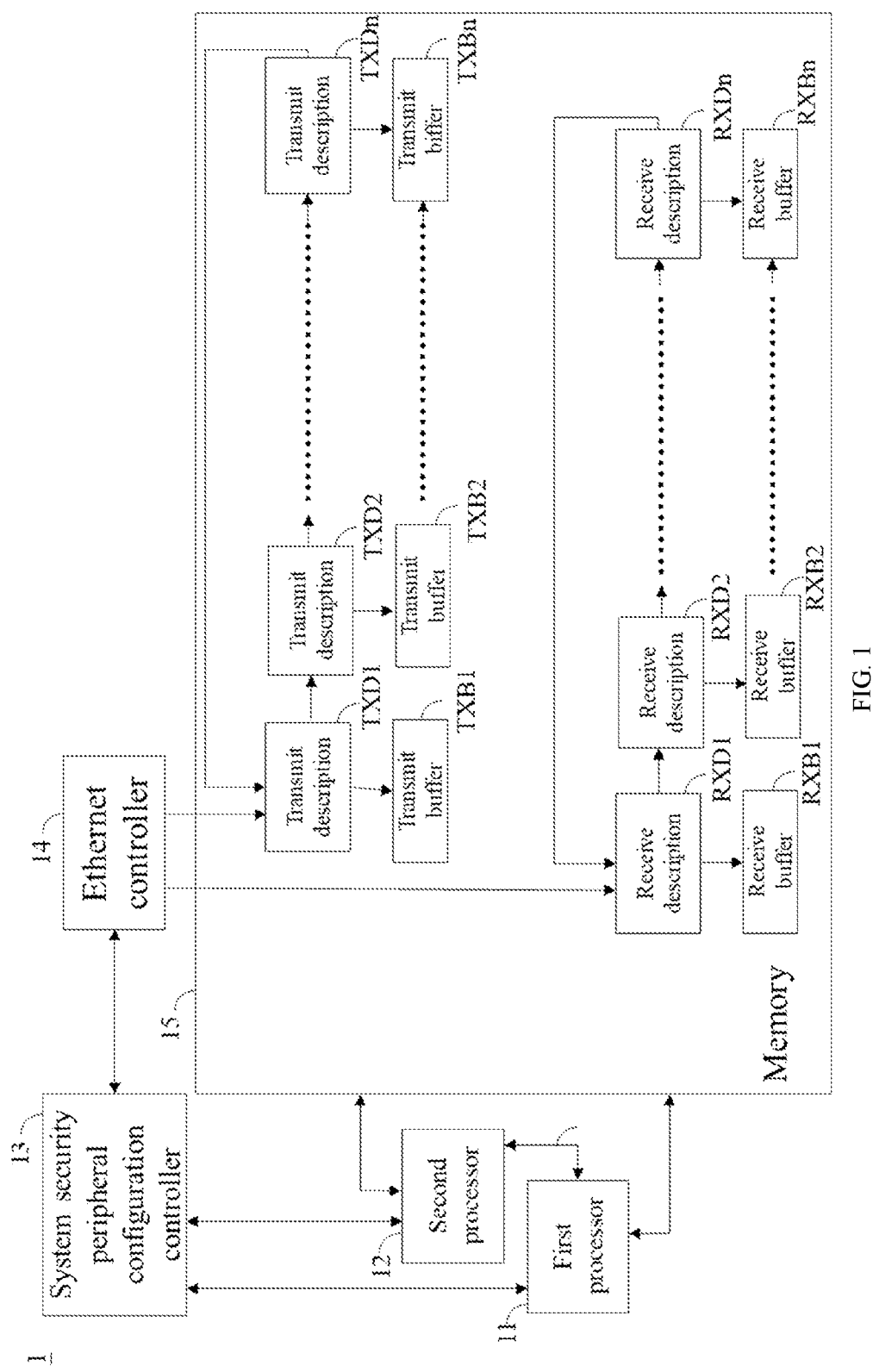
FIG. 1 is a schematic block diagram of a multi-processor device of the related art.
Figure 2:
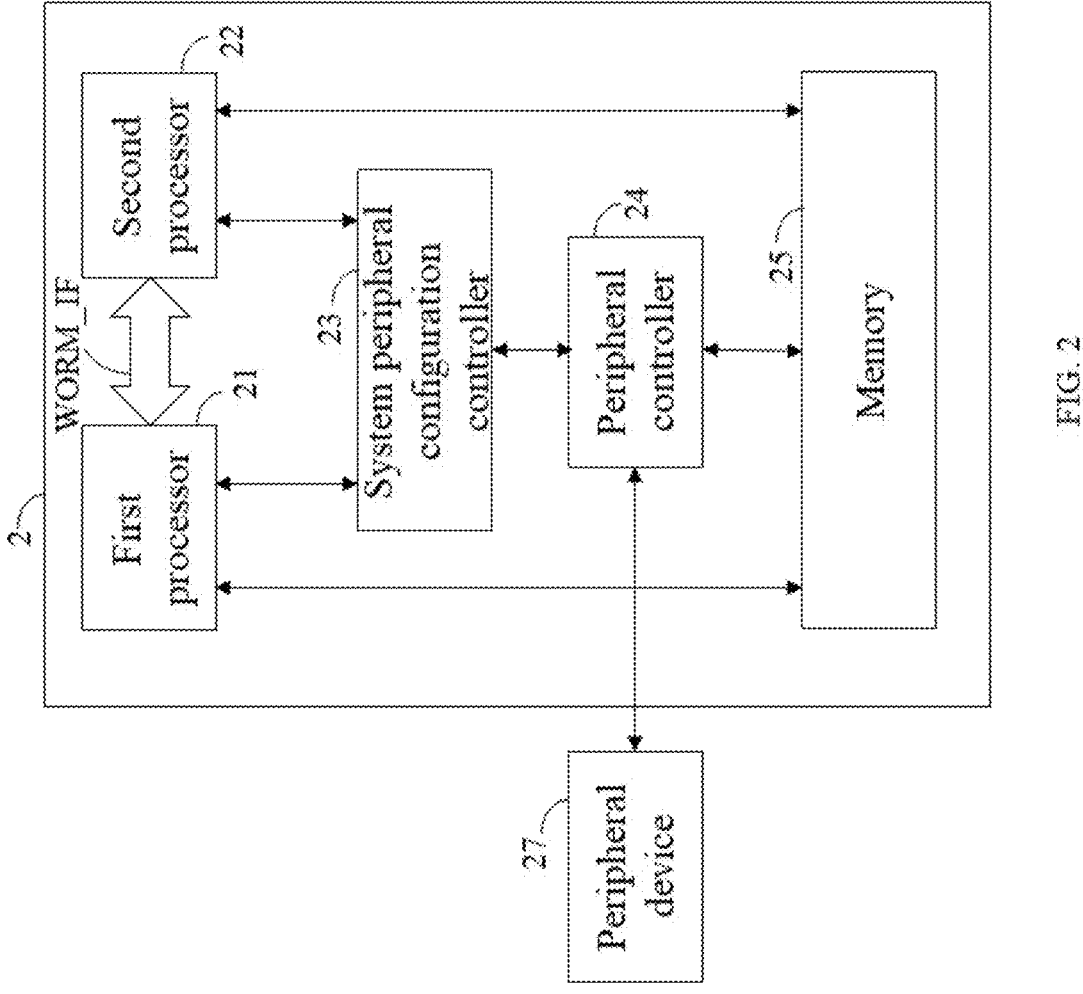
FIG. 2 is a schematic block diagram of a multi-processor device according to an embodiment of the present disclosure.
Figure 3:
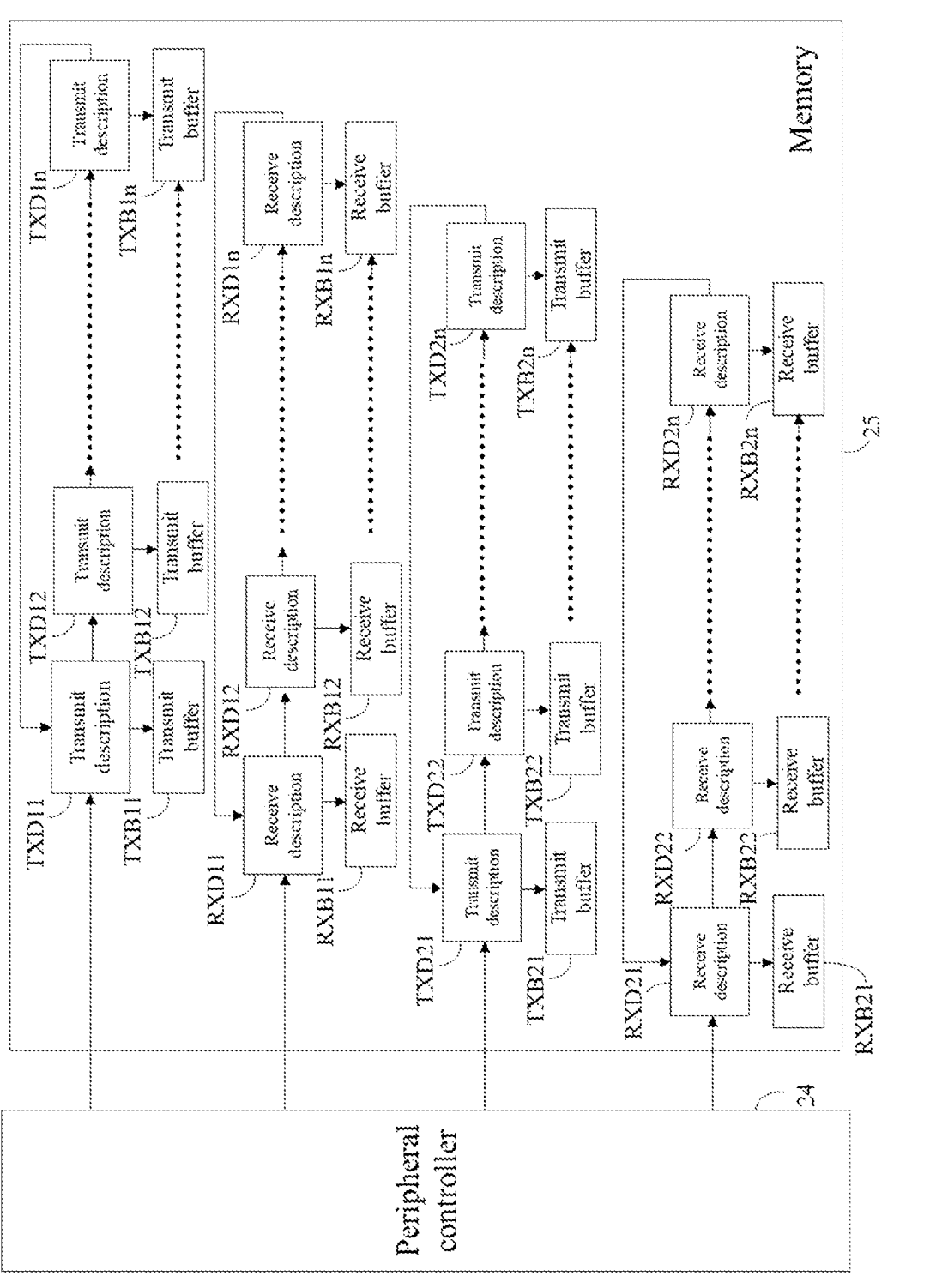
FIG. 3 is a schematic configuration diagram of a transmit description, a receive description, a transmit buffer and a receive buffer of a multi-processor device configured in a memory.

Please refer to FIG. 2 and FIG. 3, FIG. 2 is a schematic block diagram of a multi-processor device according to an embodiments of the present disclosure, and FIG. 3 is a schematic configuration diagram of a transmit description, a receive description, a transmit buffer and a receive buffer of a multi-processor device configured in a memory. The multi-processor device 2 may be implemented by a system on a chip (SOC). The multi-processor device 2 comprises the first processor 21, the second processor 22, the system peripheral configuration controller 23, the peripheral controller 24 and the memory 25. The peripheral configuration controller 23 is, for example, a security system peripheral configuration controller, but the present disclosure is not limited thereto. The first processor 21 is electrically connected to the memory 25. The second processor 22 is electrically connected to the first processor 21 and the memory 25. The second processor 22 performs transmission via a specific transmission interface WORM_IF commonly known as the wormhole. The system peripheral configuration controller 23 is electrically connected to the first processor 21, the second processor 22 and the peripheral controller 24. The system peripheral configuration controller 23 is used to allocate the peripheral controller 24 to the first processor 21 or the second processor 22. The peripheral controller 24 is electrically connected the memory 25. In other embodiments, the memory 25 may be disposed outside the multi-processor device 2. That is, the memory 25 is not an essential component for the multi-processor device 2. One of the first processor 21 and the second processor 22 is, for example, a Cortxe-A35 dual-core central processing unit (CPU), and the other is, for example, a Cortex-M4 CPU with relatively general performance, but the present disclosure is not limited thereto.

In the embodiment of the present disclosure, the memory 25 is allocated to at least one transmit description TXD11~TXD1$n$ of the first processor 21, at least one receive description RXD11~RXD1$n$ of the first processor 21, at least one transmit buffer TXB11~TXB1$n$ corresponding to the transmit descriptions TXD11~TXD1$n$ and at least one receive buffer RXB11~RXB1$n$ corresponding to the receive descriptions RXD11~RXD1$n$. The memory 25 is allocated to at least one transmit description TXD21~TXD2$n$ of the second processor 22, at least one receive description RXD21~RXD2$n$ of the second processor 22, at least one transmit buffer TXB21~TXB2$n$ corresponding to the transmit descriptions TXD21~TXD2$n$ and at least one receive buffer RXB21~RXB2$n$ corresponding to the receive descriptions RXD21~RXD2$n$. Because of the above configuration, the peripheral controller 24 can be shared by the first processor 21 and the second processor 22.

The plurality of transmit descriptions TXD11~TXD1$n$ form a transmit description string of the first processor 21. The plurality of receive descriptions RXD11~RXD1$n$ form a receive description string of the first processor 21. The plurality of transmit descriptions TXD21~TXD2$n$ form a transmit description string of the second processor 22. The plurality of receive descriptions RXD21~RXD2$n$ form a receive description string of the second processor 22. The transmit description strings and the receive description strings of the first processor 21 and the second processor 22 have corresponding addresses, so that the first processor 21 and the second processor 22 can point to the transmit descriptions TXD11~TXD1$n$, TXD21~TXD2$n$, the receive descriptions RXD11~RXD1$n$ and RXD21~TXD2$n$ via the addresses.

The allocation of the transmit descriptions TXD11~TXD1$n$, the receive descriptions RXD11~RXD1$n$, the transmit buffers TXB11~TXB1$n$ and the receive buffers RXB11~RXB1$n$ in the memory is configured by the first processor 21 via a software driver. The allocation of the transmit descriptions TXD21~TXD2$n$, the receive descriptions RXD21~RXD2$n$, the transmit buffers TXB21~TXB2$n$ and the receive buffers RXB21~RXB2$n$ in the memory is configured by the second processor 22 via a software driver.

The following descriptions take the peripheral controller 24 being allocated to the first processor 21 as an example, but the present disclosure is not limited thereto. Via the descriptions as following, a person having ordinary skill in the art of the present disclosure can also know the implementations which the peripheral controller 24 is shared by the first processor 21 and the second processor 22 when the peripheral controller 24 is allocated to the second processor 22. Thus, it only takes the peripheral controller 24 being allocated to the first processor 21 as an example.

When the second processor 22 will transmit the data to the peripheral device 27 which is electrically connected to the peripheral controller 24, the second processor 22 stores the data in the transmit buffers TXB21~TXB2$n$ corresponding to the transmit descriptions TXD21~TXD2$n$ of the second processor 22. The first processor 21 control the peripheral controller 24 to make the peripheral device 27 obtain the data in the transmit buffers TXB21~TXB2$n$ corresponding to the transmit descriptions TXD21~TXD2$n$ of the second processor 22.

When the first processor 21 will transmit the data to the peripheral device 27, the first processor 21 stores the data in the transmit buffers TXB11~TXB1$n$ corresponding to the transmit descriptions TXD11~TXD1$n$ of the first processor 21. The first processor 21 control the peripheral controller 24 to make the peripheral device 27 obtain the data in the transmit buffers TXB11~TXB1$n$ corresponding to the transmit descriptions TXD11~TXD1$n$ of the first processor 21.

When the peripheral controller 24 receives the data transmitted via the peripheral device 27, The first processor 21 control the peripheral controller 24 to store the data in the receive buffers RXB11~RXB1$n$ corresponding to the receive descriptions RXD11~RXD1$n$ of the first processor 21 and/or in the receive buffers RXB21~RXB2$n$ corresponding to the receive descriptions RXD21~RXD2$n$ of the second processor 22 based on the device identification of the data. The first processor 21 is used to receive the data in the receive buffers RXB11~RXB1$n$ corresponding to the receive descriptions RXD11~RXD1$n$ of the first processor 21. The second processor 22 is used to receive the data in the receive buffers RXB21~RXB2$n$ corresponding to the receive descriptions RXD21~RXD2$n$ of the second processor 22.

Please note that the memory 25 is allocated to the transmit descriptions TXD11~TXD1$n$, TXD21~TXD2$n$, the receive descriptions RXD11~RXD1$n$, RXD21~TXD2$n$, the transmit buffers TXB11~TXB1$n$, TXB21~TXB2$n$, and the receive buffers RXB11~RXB1$n$ and RXB21~TXB2$n$, but the present disclosure is not limited thereto. The peripheral controller 24 is a network controller. The peripheral device 27 is a network card. The device identification is a media access control (MAC) address. When the implementation situation is that the data stored in each of the transmit buffers TXD11~TXD1$n$, TXD21~TXD2$n$, the receive buffers RXD11~RXD1$n$, RXD21~RXD2$n$ is a data packet, the above configuration must be used.

However, in some embodiments, the peripheral device 27, such as an audio broadcasting device, is simply used to transmit the data, but not to receive the data. In the embodiments, the memory 25 only needs to be allocated to the transmit descriptions TXD11~TXD1$n$, TXD21~TXD2$n$, the transmit buffers TXB11~TXB1$n$ and TXB21~TXB2$n$. In other embodiments, the peripheral device 27, such as a big data collection device, is simply used to receive the data, but not to transmit the data. In the embodiments, the memory 25 only needs to be allocated to the receive descriptions RXD11~RXD1$n$, RXD21~TXD2$n$, the receive buffers RXB11~RXB1$n$ and RXB21~TXB2$n$.

Figure 5:
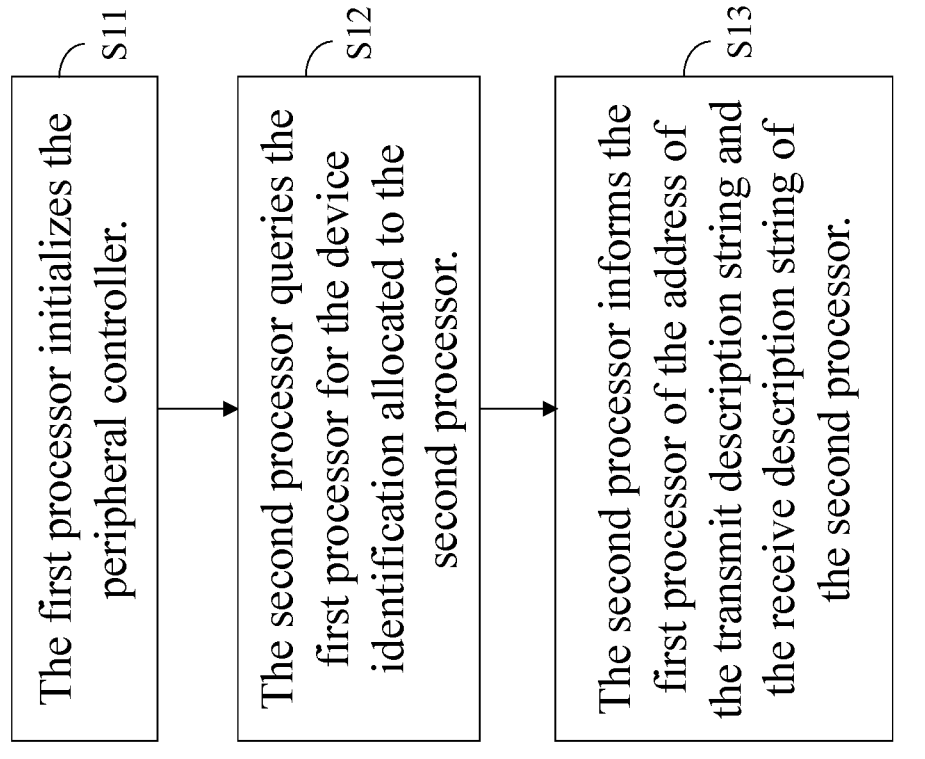
FIG. 5 is a schematic flowchart of initializing a peripheral controller sharing method according to an embodiment of the present disclosure.

Please refer FIG. 2, FIG. 3 and FIG. 5 at the same time, FIG. 5 is a schematic flowchart diagram of a peripheral controller sharing method of an embodiment according to the present disclosure. In step S11, the first processer 21 initializes the peripheral controller 24 because the peripheral controller 24 is allocated to the first processor 21. The device identification of the first processor 21 and the device identification of the second processor 22 are allocated. Besides, the memory 25 also performs the above allocation for the first processor 21 and the second processor 22 in step S11.

In step S12, the second processor 22 queries the first processor 21 the device identification allocated to the second processor 22 via the specific transmission interface WORM_IF after the first processor 21 initializes the peripheral controller 24 completely. Next, in the step S13, the second processor 22 is used to inform the first processor 21 of the addresses of the transmit descriptions TXD21~TXD2$n$ and the receive descriptions RXD21~RXD2$n$ of the second processor 22 which the memory 25 is allocated to via the specific transmission interface WORM_IF. In this way, the first processor 21 not only can point to the addresses of the transmit description string and the receive description string of the first processor 21, but also can inform the second processor 22 to point to the addresses of the transmit description string and the receive description string of the second processor 22. Thus, the subsequent data transmission and reception can be performed.

Please refer to FIG. 2, FIG. 3 and FIG. 6 at the same time, FIG. 6 is a schematic flowchart diagram of a peripheral controller sharing method according to another embodiment of the present disclosure. When the second processor 22 will transmit the data to the peripheral device 27, the steps are described as follows. Firstly, in the step S21, the second processor 22 connects the pointing address of the transmit description string of the second processor 22 to know the address that the data to be transmitted should be stored in the memory 25. Moreover, the address which the data is stored is the addresses of the transmit buffers TXB11~TXB1$n$. In one of the embodiments of the present disclosure, the order of storing the data utilizes the manner of cyclic first-in and first-out. In this way, the second processor 22 stores the data in the transmit buffers TXB21~TXB2$n$ corresponding to the transmit descriptions TXD21~TXD2$n$ of the second processor 22.

In step S22, the first processor 21 determines that there is the data to be transmitted by the second processor 22 in the memory 25 after the second processor 22 stores the data in the transmit buffers TXB21~TXB2$n$ corresponding to the transmit descriptions TXD21~TXD2$n$ of the second processor 22. The first processor 21 makes the peripheral controller 24 obtain the data in the transmit buffers TXB21~TXB2$n$ corresponding to the transmit descriptions TXD21 ~TXD2$n$ of the second processor 22. Then, the obtained data is transmitted to the peripheral device 27. In step S23, the peripheral controller 24 sends a transmit interrupt to the first processor 21 after the peripheral device 27 transmits the data in the transmit buffers TXB21~TXB2$n$ completely. The first processor 21 transmits the transmit interrupt to the second processor 22 via the specific transmission interface_WORM IF, so that the second processor 22 knowns that the data is transmitted to the peripheral device 27. In step S24, the second processor 22 receives the transmit interrupt via a running software driver and performs associated process to complete the data transmission.

Please refer to FIG. 2, FIG. 3 and FIG. 7, FIG. 7 is a schematic flowchart of receiving data via a peripheral controller sharing method according to an embodiment of the present disclosure. When the peripheral controller 24 receives the data transmitted by the peripheral device 27, the process of receiving data is described as follows. In step S31, the peripheral controller 24 determines the device identification of the data transmitted by the peripheral device 27. The data is stored in the corresponding receive buffers RXB11~RXB1$n$ and/or RXB21~RXB2$n$.

Further, when the device identification of the data is corresponded to the first processor 21, the peripheral controller 24 stores the data in the receive buffers RXB11~RXB1$n$ corresponding to the receive descriptions RXD11~RXD1$n$ of the first processor 21. When the device identification of the data is corresponded to the second processor 22, the peripheral controller 24 stores the data in the receive buffers RXB21~RXB2$n$ corresponding to the receive descriptions RXD21~RXD2$n$ of the second processor 22. When the device identification is corresponded to the first processor 21 and the second processor 22, that is, the data is broadcast or multicast to the first processor 21 and the second processor 22, the peripheral controller 24 stores the data in the receive buffers RXB11~RXB1$n$ and RXB21~RXB2$n$.

Next, in step S32, the peripheral controller 24 sends a receive interrupt to the first processor 21 after the peripheral controller 24 stores the data in the receive buffers RXB21~RXB2$n$ corresponding to the receive descriptions RXD21~RXD2$n$ of the second processor 22. The first processor 21 transmits the receive interrupt to the second processor 22 via the specific transmission interface WORM_IF. Then, in step S33, the second processor 22 obtains the data in the receive buffers RXB21~RXB2$n$ corresponding to the receive descriptions RXD21~RXD2$n$ of the second processor 22.

Figure 4:
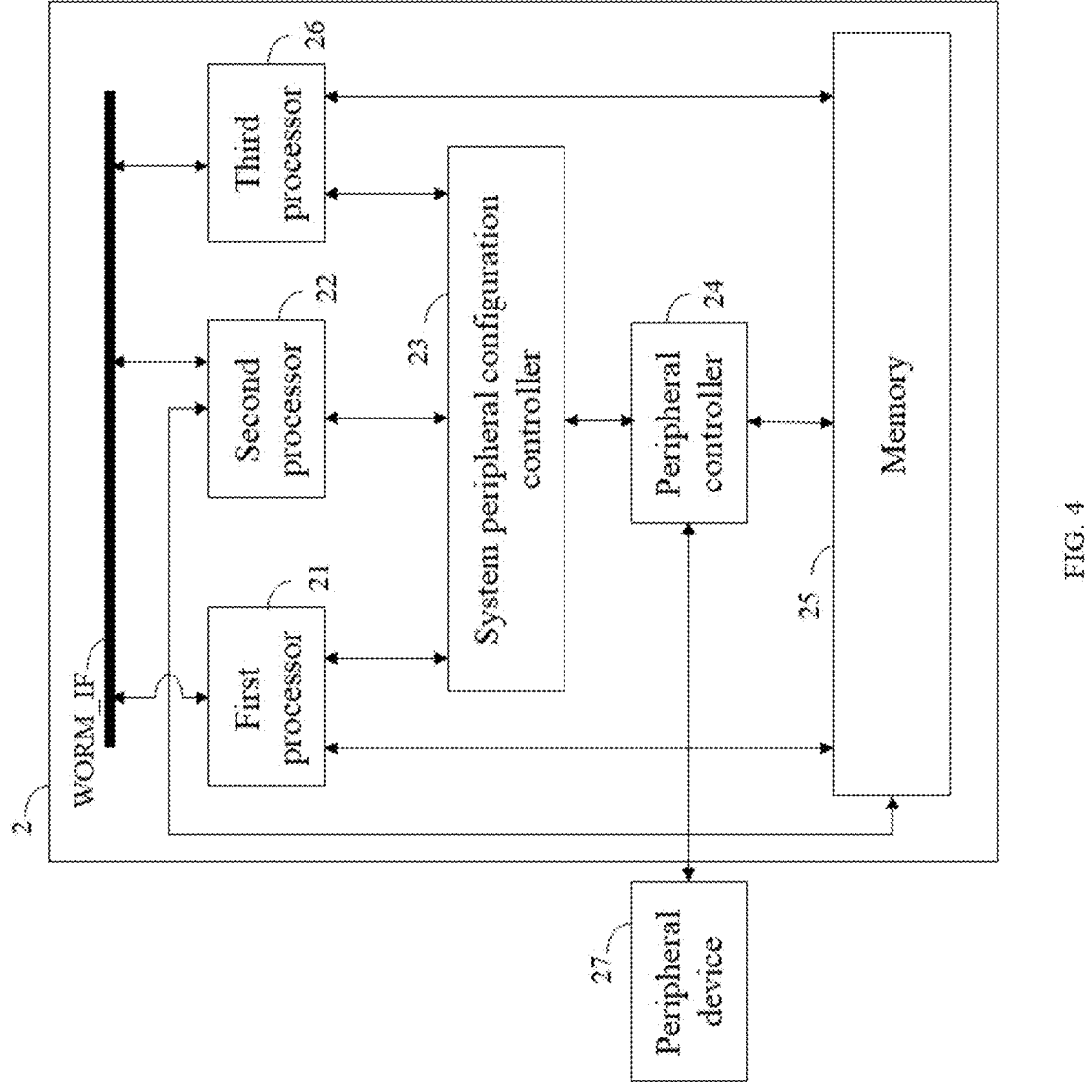
FIG. 4 is a schematic block diagram of a multi-processor device according to another embodiment of the present disclosure.

Please refer to FIG. 4, FIG. 4 is a schematic block diagram of a multi-processor device according to another embodiment of the present disclosure. Different from the previous embodiments, the multi-processor device 2 of FIG. 4 further comprises the third processor 26. The third processor 26 is electrically connected to the memory 25, the system peripheral configuration controller 23, the first processor 21 and the second processor 22. The third processor 26 performs transmitting via the specific transmission interface WORM_IF among the first processor 21 and the second processor 22. The memory 25 is allocated to the transmit description string, the receive description string, the transmit buffer and the receive buffer for the third processor 26, too. The implementation that the third processor 26 shares the peripheral controller 24 with the first processor 21 and the second processor 22 can be deduced by analogy, so it will not be repeated here.

As stated as above, the multi-processor device, the data processing system and the peripheral controller sharing method provided by the present disclosure mainly allow the memory to be allocated to the transmit description string and the receive description string for two processors, so that each of the two processors can still utilize its own transmit buffer of the transmit description string and the receive buffer of the receive description string respectively under the situation that the peripheral controller is controlled by one of the processors. Therefore, the two processors can share the same peripheral device to process the associated data. For the processor which the peripheral controller is not allocated to, the processor uses the peripheral device almost in the background to process the associated data.

It should be understood that the examples and the embodiments described herein are for illustrative purpose only, and various modifications or changes in view of them will be suggested to those skilled in the art, and will be comprised in the spirit and scope of the application and the appendix with the scope of the claims.

What is claimed is:

1. A multi-processor device, comprising:
a first processor, electrically connected to a memory;
a second processor, electrically connected to the first processor and the memory, and configured to communicate with the first processor via a specific transmission interface;
a system peripheral configuration controller, electrically connected to the first processor, the second processor and a peripheral controller, and configured to allocate the peripheral controller to the first processor or the second processor; and
the peripheral controller, electrically connected to the memory;
wherein the memory is allocated to a transmit description of the first processor and a transmit buffer corresponding to the transmit description of the first processor, and a transmit description of the second processor and a transmit buffer corresponding to the transmit description of the second processor, and
wherein when the peripheral controller is allocated to the first processor and the second processor will transmit a data to a peripheral device electrically connected to the peripheral controller, the second processor stores the data in the transmit buffer corresponding to the transmit description of the second processor, and the first processor controls the peripheral controller so that the peripheral device obtains the data in the transmit buffer corresponding to the transmit description of the second processor;
wherein the first processor is configured to initialize the peripheral controller,
wherein after the first processor initializes the peripheral controller completely, the second processor queries the first processor for the device identification allocated to the second processor via the specific transmission interface, and
wherein the second processor is configured to inform the first processor of the addresses of the transmit description and a receive description of the second processor which the memory is allocated to via the specific transmission interface.

2. The multi-processor device according to the claim 1, wherein when the peripheral controller is allocated to the first processor and the first processor will transmit the data to the peripheral device, the first processor stores the data in the transmit buffer corresponding to the transmit description of the first processor, and the first processor controls the peripheral controller so that the peripheral device obtains the data in the transmit buffer corresponding to the transmit description of the first processor.

3. The multi-processor device according to the claim 2, wherein the memory is allocated to a receive description of the first processor and a receive buffer corresponding to the receive description of the first processor, and a receive description of the second processor and a receive buffer corresponding to the receive description of the second processor,
wherein when the peripheral controller is allocated to the first processor and the peripheral controller receives the data transmitted via the peripheral device, the first processor controls the peripheral controller to store the data in the receive buffer corresponding to the receive description of the first processor and/or in the receive buffer corresponding to the receive description of the second processor based on a device identification corresponding to the data, and
wherein the first processor is configured to receive the data in the receive buffer corresponding to the receive description of the first processor, and the second processor is configured to receive the data in the receive buffer corresponding to the receive description of the second processor.

4. The multi-processor device according to the claim 1, wherein when the peripheral controller is allocated to the first processor and the second processor transmits the data to the peripheral device:
after the second processor stores the data in the transmit buffer corresponding to the transmit description of the second processor, the first processor controls the peripheral controller to obtain the data in the transmit buffer corresponding to the transmit description of the second processor, and the peripheral controller transmits the obtained data to the peripheral device, and
after the peripheral controller transmits the obtained data to the peripheral device, the first processor transmits a transmission interruption to the second processor via the specific transmission interface, so that the second processor is notified of a message that the data is transmitted to the peripheral device.

5. The multi-processor device according to the claim 3, wherein the peripheral controller is an Ethernet controller, the peripheral device is an Ethernet network card, the device identification is a media access control (MAC) address, and each of the data stored in the transmit buffer and the receive buffer is a packet.

6. The multi-processor device according to the claim 3, further comprising:
a third processor, electrically connected to the memory, the system peripheral configuration controller, the first processor and the second processor, and configured to communicate with the first processor and the second processor via the specific transmission interface.

7. A multi-processor device, comprising:

a first processor, electrically connected to a memory;

a second processor, electrically connected the first processor and the memory, and configured to communicate with the first processor via a specific transmission interface;

a system peripheral configuration controller, electrically connected to the first processor, the second processor and a peripheral controller, and configured to allocate the peripheral controller to the first processor or the second processor; and the peripheral controller, electrically connected to the memory;

wherein the memory is allocated to a receive description of the first processor and a receive buffer corresponding to the receive description of the first processor, and a receive description of the second processor and a receive buffer corresponding to the receive buffer of the second processor, wherein when the peripheral controller is allocated to the first processor and the peripheral controller receives a data via a peripheral device electrically connected to the peripheral controller, the first processor controls the peripheral controller to store the data in the receive buffer corresponding to the receive description of the first processor and/or in the receive buffer corresponding to the receive description of the second processor based on a device identification of the data, and wherein the first processor is configured to receive the data in the receive buffer corresponding to the receive description of the first processor, and the second processor is configured to receive the data in the receive buffer corresponding to the receive description of the second processor;

wherein the first processor is configured to initialize the peripheral controller, wherein after the first processor initializes the peripheral controller completely, the second processor queries the first processor for the device identification allocated to the second processor via the specific transmission interface, and wherein the second processor is configured to inform the first processor of the addresses of a transmit description and the receive description of the second processor which the memory is allocated to via the specific transmission interface.

8. A peripheral controller sharing method, which is implemented by a multi-processor device, and the method comprises:

initializing a peripheral controller of the multi-processor device by a first processor of the multi-processor to allocate a device identification of the first processor and a device identification of a second processor of the multi-processor device;

querying the first processor for the device identification allocated to the second processor by the second processor via a specific transmission interface after the first processor initializes the peripheral controller completely; and informing the first processor of addresses of a transmit description and a receive description of the second processor which a memory is allocated to by the second processor via the specific transmission interface.

* * * * *